United States Patent
Chan et al.

(10) Patent No.: US 11,989,888 B2
(45) Date of Patent: May 21, 2024

(54) IMAGE SENSOR WITH INTEGRATED EFFICIENT MULTIRESOLUTION HIERARCHICAL DEEP NEURAL NETWORK (DNN)

(71) Applicant: Sony Semiconductor Solutions Corporation, Kanagawa (JP)

(72) Inventors: Kevin Chan, San Jose, CA (US); Ping Wah Wong, Sunnyvale, CA (US); Sa Xiao, Valkenswaard (NL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 157 days.

(21) Appl. No.: 17/393,652

(22) Filed: Aug. 4, 2021

(65) Prior Publication Data

US 2023/0039592 A1   Feb. 9, 2023

(51) Int. Cl.
  *G06T 7/207*    (2017.01)
  *G06F 3/01*     (2006.01)
  *G06F 18/214*   (2023.01)
  *G06N 3/045*    (2023.01)
  *G06T 7/246*    (2017.01)

(52) U.S. Cl.
  CPC .............. *G06T 7/207* (2017.01); *G06F 3/017* (2013.01); *G06N 3/045* (2023.01); *G06T 7/246* (2017.01); *G06F 18/214* (2023.01); *G06T 2207/20081* (2013.01); *G06T 2207/20084* (2013.01)

(58) Field of Classification Search
  CPC ...................... G06T 7/207; G06T 7/246; G06T 2207/20081; G06T 2207/20084; G06F 3/017; G06F 18/214; G06N 3/045; G06N 3/0464; G06N 3/048; G06N 3/084; G06N 3/09; G06V 10/147; G06V 10/82; G06V 40/20; H04N 25/41; H04N 25/79
  USPC ...................................................... 375/240.12
  See application file for complete search history.

(56) References Cited

U.S. PATENT DOCUMENTS

| | | | |
|---|---|---|---|
| 2019/0204448 A1* | 7/2019 | Eki | H04N 23/617 |
| 2019/0325746 A1* | 10/2019 | Lewis | G06V 20/597 |
| 2021/0195085 A1* | 6/2021 | Miyake | H04N 23/611 |
| 2022/0030247 A1* | 1/2022 | Olekas | H04N 19/60 |

FOREIGN PATENT DOCUMENTS

WO    WO-2020059464 A1 *   3/2020   ......... G06K 9/00973

OTHER PUBLICATIONS

Machine translation of WO 2020059464 A1 (Year: 2020).*

* cited by examiner

*Primary Examiner* — Christopher S Kelley
*Assistant Examiner* — Ana Picon-Feliciano
(74) *Attorney, Agent, or Firm* — Michael Best & Friedrich LLP

(57) ABSTRACT

An image sensor, electronic device and method thereof that performs on-sensor multiresolution deep neural network (DNN) processing, such as for gesture recognition. The image data is transformed into first resolution type image data and second resolution type image data. Based on detecting the first resolution type image data includes a predetermined object, processing the second resolution type image data using the second resolution type image data as input into the second DNN.

21 Claims, 10 Drawing Sheets

IMAGE SENSOR WITH INTEGRATED EFFICIENT MULTIRESOLUTION HIERARCHICAL DEEP NEURAL NETWORK (DNN)

BACKGROUND OF THE INVENTION

1. Field of the Invention

This application relates generally to image sensors. More specifically, this application relates to a system and method with an on-sensor, efficient architecture for a non-redundant multiresolution hierarchical deep neural network (DNN), which is integrated in an image sensor (e.g., a complementary metal-oxide-semiconductor (CMOS) image sensor, a stacked CMOS sensor).

2. Description of Related Art

Two or more DNNs are commonly used in a hierarchical, cascaded manner with electronic devices capturing audio or image data (e.g., microphones, image sensors, cameras, smartphones with cameras). For example, a plurality of DNNs may be organized in a cascade manner to perform speech recognition, where the first DNN may be a simple, low-complexity DNN used to trigger the activation of the subsequent DNNs upon receiving a wake-up keyword (e.g. "Alexa", "Siri", "Hey Google"), and the subsequent DNNs may perform more complex analysis and processing of the user's speech.

BRIEF SUMMARY OF THE DISCLOSURE

For processing of images, a plurality of DNNs may similarly be used, where the first DNN is small and low-complexity, and subsequent DNNs perform more sophisticated processing. Detection and recognition techniques (e.g., object detection, gesture recognition, voice recognition) utilized in DNNs may require a lot of memory and are computationally intensive. However, existing DNNs are too large (memory-wise) and computationally intensive for an on-sensor implementation. Therefore, the existing DNNs are commonly implemented in a processor separate and distinct from the image sensor.

Typically, detection or recognition (e.g., gesture recognition) is performed on a general-purpose processor that is separate from a camera/sensor. The detection or recognition is performed on the separate processor which is coupled to the camera system by a communication bus. Thus, image data must be transferred from the camera to the processor to perform the detection or recognition. There is a need for on-sensor implementations that do not immensely adversely impact accuracy.

According to various embodiments of the disclosure, an electronic imaging device (e.g., a CMOS sensor) includes an on-sensor implementation of a DNN with high accuracy, while maintaining low memory usage and low computational complexity. For example, a sensor of the present disclosure is a low-power sensor containing an on-sensor DNN having a memory footprint size that is smaller than a specific value (e.g., 100 kB).

According to various embodiments, the design of the DNN structure includes a hierarchical cascade of two or more DNNs for processing natural images that reduces redundant computation by means of a non-redundant multiresolution transformation of the input data. In this cascade of DNNs, the first DNN is a small, low-complexity DNN whose output is used as a decision-making mechanism to control the activation of the subsequent DNN(s). The subsequent DNNs may be more computationally complex and perform more sophisticated functions (e.g. image recognition, object detection, etc.). The input to the first DNN is a low frequency "coarse" decomposition of the input data. The inputs to the subsequent DNN(s) are a high frequency "detail" decomposition of the input data and a subset of the intermediate feature maps from the first DNN. The low frequency "coarse" decomposition and the high frequency "detail" decomposition may be obtained, for example, by a two-dimensional (2D) discrete wavelet transform. According to various aspects of the disclosure, the implementation of this multiresolution hierarchical DNN on a stacked image sensor may be used for applications including, but not limited to, person detection, face detection, gesture recognition.

In one aspect of the present disclosure, there is provided a stacked image sensor comprising: a pixel array layer configured to capture an image and transfer image data of the captured image, and a logic and deep neural network (DNN) layer, the logic and DNN layer including a first DNN that is a preliminary DNN, and a second DNN that is different than the first DNN. The logic and DNN layer is configured to: receive the image data of the captured image directly from the pixel array layer; process first image data using the first DNN to determine whether the first image data includes a predetermined object of one or more predetermined objects and to produce first output data; and based on determining that the first image data contains the predetermined object: process the second image data in combination with the first output data using the second DNN to produce second output data; and output the second image data in combination with the second output data to a communication bus of an electronic device. The first image data may include or may be decomposed from the received image data of the captured image, and the second image data may be decomposed from the received image data of the captured image or may include image data of another captured image that is different than the captured image. The second DNN may be more computationally-intensive compared to the first DNN, according to various embodiments. However, they may differ in a different aspect instead of computational-complexity. For example, there may be applications where the first DNN processes color image data and the second DNN process monochrome data, or vice versa.

The second image data may have a higher resolution than the first image data. The first image data may include the image data of the captured image and the second image data may include the image data of the other capture image.

The logic and DNN layer is further configured to: decompose the received image data of the captured image into the first image data and the second image data by performing a non-redundant multi-resolution decomposition of the image data of the captured image data, which is raw image data from the pixel array layer. The decomposing of the received image data of the captured image includes decomposing the received image data of the captured image into at least one of: a series of binned images at different scales, a Gaussian pyramid, or a discrete wavelet transform. The first DNN and the second DNN are object detection DNNs or object classification DNNs.

The first DNN is a preliminary classification object detection DNN that detects the predetermined object from a limited class of objects. The limited class of objects includes at least a portion of a human body part. The pixel array layer is stacked on the logic and DNN layer.

The first DNN is configured to detect or predict motion between frames and the second DNN is configured to recognize a gesture in the frames where motion was detected. The stacked image sensor of claim 1, wherein the second DNN is configured to: use a convolutional block that processes each input frame independently to obtain each frame's important features; store, using a first in, first out (FIFO) queue, a temporal sequence of important features across multiple input frames; and concatenate and process features from a plurality of input frames to determine gesture probabilities for a current frame.

The first output data, which is input to the second DNN, includes a sequence of binary motion detection frames or a sequence of ternary motion detection frames. The logic and DNN processing layer is configured to: execute the convolutional block on every frame, store the convolutional block's output features for a plurality of recent frames within a recency threshold in the FIFO queue, and wait for a command to be received to begin executing the sequence processing block.

The logic and DNN processing layer is configured to execute the second DNN, which is the gesture recognition DNN, only when the number of image regions where motion is positively detected is above a first predefined threshold and/or below a second predefined threshold that is different than the first predefined threshold. The logic and DNN layer is further configured to control the output size for each convolutional block and each inverted residual block of the first DNN and the second DNN to be no larger than 100 kB. The total memory size of the weights in all convolutional blocks and all inverted residual blocks is lower than 100 kB.

In another aspect of the present disclosure, there is a method comprising: storing a first deep neural network (DNN), and a second DNN that is different than the first DNN in a logic and DNN layer of a stacked image sensor; capturing, by a pixel array layer of the stacked image sensor, an image; transferring, by the pixel array layer, image data of the captured image to the logic and DNN layer of the stacked image sensor; receiving, by the logic and DNN layer, the image data of the captured image directly from the pixel array layer; and processing, by the logic and DNN layer, first image data using the first DNN to determine whether the first image data includes a predetermined object of one or more predetermined objects and to produce first output data; and based on determining that the first image data contains the pre-determined object: processing, by the logic and DNN layer, the second image data in combination with the first output data using the second DNN to produce second output data; and outputting, by the logic and DNN layer, the second image data in combination with the second output data to a communication bus of an electronic device, wherein the first image data includes or is decomposed from the received image data of the captured image, and the second image data is decomposed from the received image data of the captured image or includes image data of another captured image that is different than the captured image.

In one aspect of the present disclosure, there is provided an electronic device comprising: a processor, a memory, an optical lens, a communications bus, and a stacked image sensor. The stacked image sensor comprises: a pixel array layer configured to capture an image and transfer image data of the captured image and a logic and deep neural network (DNN) layer, the logic and DNN layer including a first DNN that is a preliminary DNN, and a second DNN that is different than the first DNN, wherein the logic and DNN layer is configured to: receive the image data of the captured image directly from the pixel array layer; process first image data using the first DNN to determine whether the first image data includes a predetermined object of one or more predetermined objects and to produce first output data; and based on determining that the first image data contains the predetermined object: process the second image data in combination with the first output data using the second DNN to produce second output data; and output the second image data in combination with the second output data to a communication bus of an electronic device, wherein the first image data includes or is decomposed from the received image data of the captured image, and the second image data is decomposed from the received image data of the captured image or includes image data of another captured image that is different than the captured image.

In this manner, the above aspects of the present disclosure provide for improvements in at least the technical field of imaging, as well as the related technical fields of image sensor architecture, image processing, facial detection, and the like.

This disclosure can be embodied in various forms, including hardware or circuits controlled by computer-implemented methods, computer program products (e.g., transitory or non-transitory computer readable media), computer systems and networks, user interfaces, and application programming interfaces; as well as hardware-implemented methods, signal processing circuits, image sensor circuits, application specific integrated circuits, field programmable gate arrays, digital signal processors, general purpose central processing units, and the like. The foregoing summary is intended solely to give a general idea of various aspects of the present disclosure and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely examples and not intended to limit the scope of this application.

Moreover, while the present disclosure focuses mainly on examples in which the DNNs are used in image sensors, it will be understood that this is merely one example of an implementation. It will further be understood that the disclosed devices, systems and methods can be used in any device in which there is a need to perform detection or recognition (e.g., of captured images), in a smartphone or tablet, and the like. Furthermore, the image sensor implementations described below may be incorporated into an electronic apparatus, including but not limited to a smartphone, a tablet computer, a laptop computer, and the like.

Imaging Device

Figure 1:
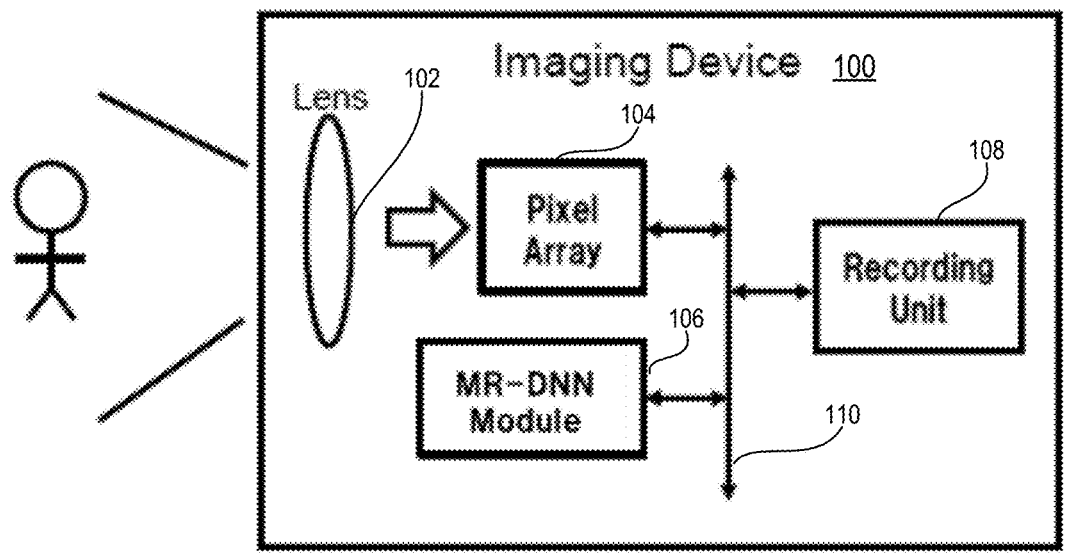
FIG. 1 is a diagram illustrating an imaging device, in accordance with various aspects of the present disclosure.

FIG. 1 illustrates an electronic imaging device 100 according to various aspects of the present disclosure. The electronic imaging device 10 is a camera, a smartphone, a tablet or the like.

As shown in FIG. 1, according to an embodiment, an imaging device 100 comprises an optical lens 102, a pixel array unit 104, a multiresolution detection DNN module 106, a recording unit 108 (e.g., a memory) and a communication bus 110. The pixel array unit 104 may be an image sensor that has millions (e.g., up to tens of millions) of pixel circuits ("megapixels" or MP) or more. The multiresolution detection DNN module will be used as an example embodiment of the DNN modules for illustrative purposes.

The multiresolution detection DNN module 106 is implemented by a hardware processor or hardware circuitry and also includes a memory (e.g., dynamic random access memory (DRAM), static random access memory (SRAM) or synchronous DRAM (SDRAM)). As shown in FIG. 1 by way of a single direction arrow, the lens 102 receives light that is transferred to the pixel array 104. As shown in FIG. 1, the pixel array 104, the multiresolution detection DNN 106, and the recording unit 108 all communicate with (transfer information to and receive information from) each other via communication bus 110.

The multiresolution detection DNN 106 is configured to output information to another electronic device (e.g., an application hardware processor), such as a server or external processor. The multiresolution detection DNN 106 may also be configured to receive information from the other electronic device, such as a processor.

Figure 2:
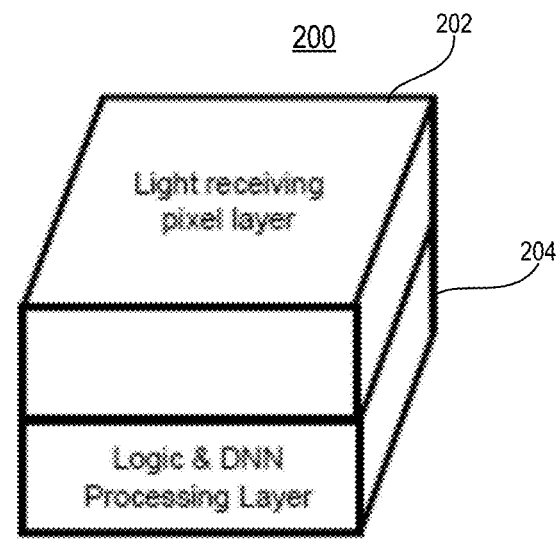
FIG. 2 is a diagram illustrating a stacked image sensor, in accordance with various aspects of the present disclosure.

FIG. 2 is a diagram illustrating an example of stacked image sensor 200, in accordance with various aspects of the present disclosure. As shown in FIG. 2, the stacked image sensor 200 comprises a light receiving pixel layer 202, and a logic and DNN processing layer 204.

The light receiving pixel layer 202 is configured to capture an image and output image data of the captured image to the logic and DNN processing layer 204. The logic and processing layer 204 includes hardware (e.g., one or more of a processor, a graphics processor, a memory (e.g., DRAM or SDRAM), and the like) that performs logic functionality (e.g., see FIGS. 7-9 below) and DNN processing, such as one or more of the multiresolution detection DNN (e.g., including the lower-power gesture recognition processing) described below.

According to an embodiment, as shown in FIG. 2, the stacked image sensor 202 includes the light receiving pixel layer 202 being stacked on top of (located above) the logic and DNN processing layer 204 in a stacking direction. The two layers are be electrically connected to each other, as shown in FIG. 2, such as by a through-silicon via (TSV).

The stacked image sensor provides the pixel layer 202 and the logic and DNN processing layer 204 on one chip (e.g., a stacked integrated circuit). For example, the sensor is a low-power sensor having a memory footprint size that is smaller than a specific value (e.g., 100 kB). The reduced size of the DNN(s) allows the logic and DNN processing layer 204 to be implemented in hardware with a small area footprint, thereby enabling implementation on a low-power image sensor.

While FIG. 2 shows a stacked embodiment, other forms of implementing the DNN with an image sensor are possible. For example, the DNN could be on the same piece of semiconductor in a side-by-side configuration with the image sensor. In another example, the DNN can be on a separate piece of semiconductor from the image sensor, and then the two pieces of semiconductor with the image sensor and the DNN may be wire bonded together onto a substrate.

As discussed above, computing power is reduced with a hierarchical DNN design. In addition, redundancy may be reduced with a multiresolution decomposition. For example, a DNN structure using an inverted residual block reduces memory and computational complexity (thereby reducing processing load). A DNN may use a single affine layer to process concatenated features to reduce computational complexity. Gesture recognition may be implemented on a stacked image sensor. The gesture recognition may be performed with motion detection data to reduce memory and power usage. Reducing the processing load (e.g., reducing redundant processing) of a DNN is usually a desirable enhancement (e.g., environmentally-friendly artificial intelligence (AI)).

The DNN architecture of the present disclosure has a smaller memory footprint than the related technology. For example, according to some embodiments, the DNN model has a memory footprint that is 100 kB or less. As discussed below with reference to FIGS. 3-10, the image sensor (e.g., the stacked image sensor 200), according to various embodiments, has a combination of architecture and algorithmic structures for efficient hardware implementation of the multiresolution DNN(s) into a low-power CMOS image sensor, as an example. The disclosure describes the combination of architecture and algorithmic structures to reduce memory and power that are specific to neural network processing.

Figure 3:
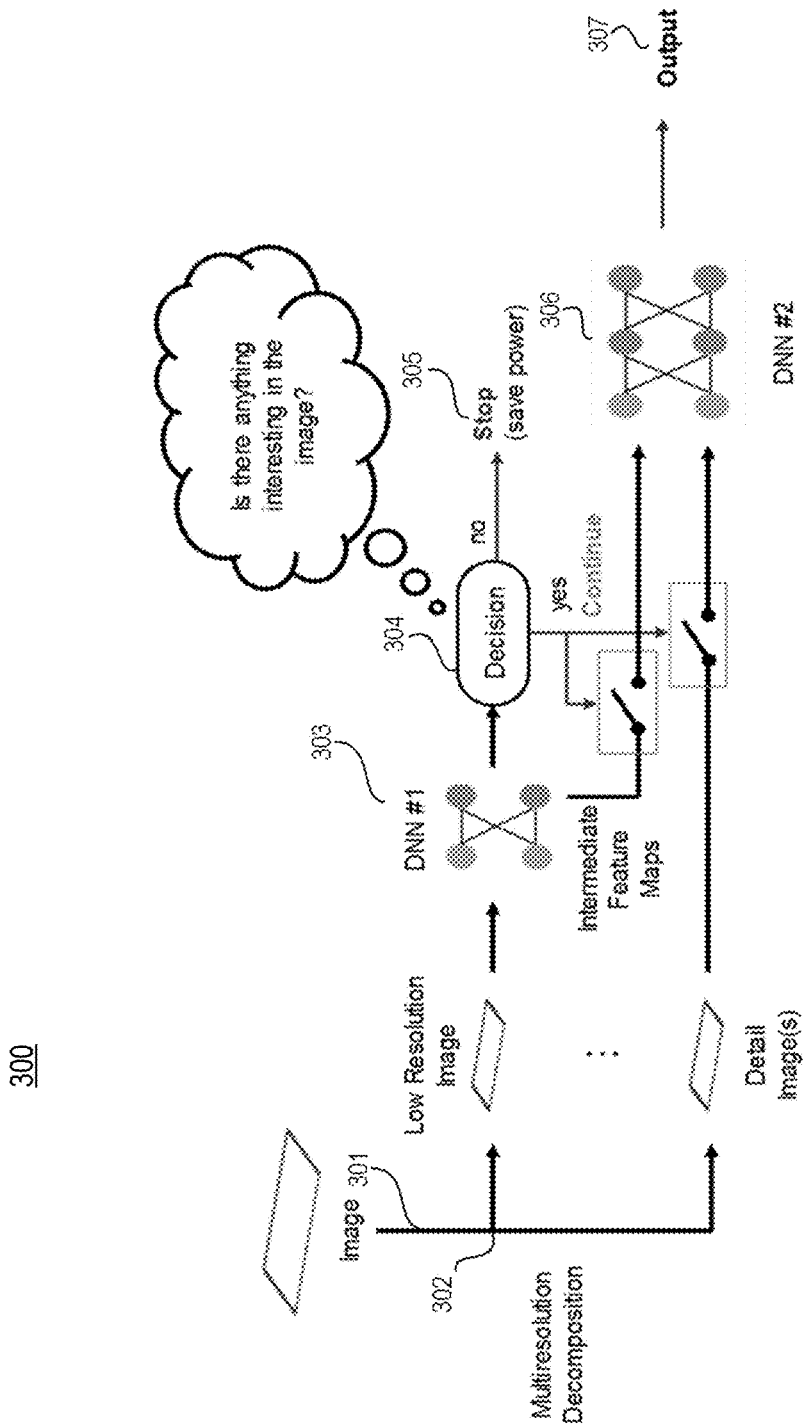
FIG. 3 is a diagram illustrating a method performed by the logic and DNN processing layer of a stacked image sensor, in accordance with various aspects of the present disclosure.

FIG. 3 is a diagram illustrating a method 300 performed by the logic and DNN processing layer of a stacked image sensor, in accordance with various aspects of the present disclosure. As shown in FIG. 3, the method 300 includes one or more of Operations 301-307. The processing 300 may be performed by the logic and DNN processing layer discussed above. According to an embodiment, an image data (e.g., an image region) is obtained. Operation 301 may include obtaining the image data from an input image buffer and/or directly from a pixel array layer (Operation 301).

In Operation 302, the image data may be transformed into first resolution type image data and second resolution type image data by decomposing the received image data. The second resolution type image data (e.g., high resolution details image) has a higher resolution than the first resolution type image data (e.g., a low resolution image). The low resolution image may have a resolution below a threshold, and the high resolution image may have a resolution above the threshold, or above a different threshold.

In Operation 303, a first DNN (e.g., an initial, small DNN) process the first resolution type image data (e.g., a low resolution image) to determine whether further processing is necessary. Operation 303 may include using the first resolution type image data as an input into the first DNN, which may be a preliminary classification object detection DNN. Based on the output of the first DNN, a determination or detection of whether the first resolution type image data includes a predetermined object of one or more predetermined objects may be performed (Operation 304).

Based on determining (or detecting) that the first resolution type image contains the pre-determined object (Operation 304: YES), the second resolution type image data (e.g., one or more high resolution images) may be processed using the second resolution type image data as input into the second DNN with intermediate feature maps from the first DNN (e.g., DNN #1) (Operation 306).

Based on determining (or detecting) that the first resolution type image does not contain the pre-determined object (Operation 304: NO), the second resolution type image data (e.g., one or more high resolution images) may not be further processed (i.e., the second DNN is not used for the received image data that does not contain the predetermine object) (Operation 305). That is, when the received image data is not interesting (e.g., no predetermined object(s) is detected), power may be saved by ending the processing for the input image data. When the received image data is interesting, the second DNN processing (e.g., DNN #2) may be performed as described herein (e.g., with intermediate feature maps from the first DNN (e.g., DNN #1)). That is, when further processing is needed (e.g., something interesting, such as one or more predetermined objects are detected in the image data by the first DNN), a second DNN (DNN #2) processes the high resolution details and intermediate feature maps from the first DNN, thereby reducing redundant computation compared to fully processing a high resolution image directly with the second DNN (without the benefit of the first DNN's intermediate feature maps).

The method 300 further includes an Operation 307 of outputting image data (e.g., the original image data, or a processed version of the original image data) and the second DNN's output data to an off-sensor electronic device (e.g., a central processing unit (CPU) or a graphics processing unit (GPU)).

This Multiresolution (MR)-DNN architecture may be used in an object detection application (for example: face detection, person detection, etc.). In this scenario, the first DNN (DNN #1) may identify whether or not there is a single-object (e.g., a person) present in the image, and the second DNN (DNN #2) may perform a more difficult/complex task (e.g., the more difficult task of locating the size and position of all people present in the image).

Multiresolution Decomposition

In one embodiment, MR-DNN architecture may perform Operation 302 by using binning with a large bin size to obtain the low resolution image, and may use binning with smaller bin sizes to obtain the higher resolution detail image(s). In another embodiment, the MR-DNN architecture may perform Operation 302 by using a Gaussian pyramid to obtain the low resolution image and the detail image(s). In another embodiment, the MR-DNN architecture may perform Operation 302 by using a discrete wavelet transform to obtain the low resolution images and the detail image(s). In another embodiment, the MR-DNN architecture may perform Operation 302 by using a non-uniform sampling pattern, such as compressive sensing sampling, to obtain the low resolution (less information) image and the detail (more information) image(s). In another embodiment, the MR-DNN architecture may perform Operation 302 by using spatial edge detection to obtain a high resolution detail image(s).

Design of DNN #1 and DNN #2

According to various embodiments, the first DNN and the second DNN (e.g., DNN #1 and DNN #2) may be designed such that they are two sub-modules of a single larger DNN. Compared to using only a single larger DNN, the MR-DNN architecture saves power when the first DNN (DNN #1) determines no additional processing is required (i.e., Operation 304: NO). The amount of power savings depends on the relative size and complexity of the first DNN and the second DNN. As discussed above, when the first DNN indicates additional processing is needed (Operation 304: YES), the outputs of one or more intermediate layers from the first DNN, as well as the detail image(s) from the multiresolution decomposition, are fed into the second DNN (Operation 306).

In one embodiment, the intermediate feature maps from the first DNN are summed together with the detail image(s) and the result is passed into the input stage of the second DNN. Upsampling of the intermediate feature map from the first DNN may be needed depending on the specific multiresolution decomposition method. The upsampling method may include bilinear interpolation, transposed convolution, or other suitable upsampling processes.

In another embodiment, the intermediate feature maps from the first DNN are concatenated with the detail image(s) and the result is passed into the input stage of the second DNN. In another embodiment, the detail image(s) are passed into the input stage of the second DNN, while the intermediate feature maps from the first DNN are passed to the second DNN at various stages throughout the DNN architecture.

Gesture Recognition

As discussed above, this Multiresolution (MR)-DNN architecture may be used in an object detection application. According to an embodiment, the first DNN may determine whether any motion has occurred, and the second DNN may perform gesture recognition (e.g., detect a body part (e.g., a hand) as a predetermined object and any movement by the hand). In this context, according to various embodiments, gesture recognition may refer to the automated process of (1) capturing sensor data corresponding to a human user's hand motion, and (2) using a computer algorithm to determine to which of a predefined set of hand motions (if any) the captured data belongs. Gesture recognition may be used as part of a user interface system to control an electronic device using human hand motions.

In this context, a convolutional block refers to a set of one or more convolutional layers connected sequentially, where each convolutional layer is followed by a nonlinear activation function such as a rectified linear unit (ReLU). In this context, an inverted residual block refers to a set of one or more convolutional layers, depthwise convolutional layers, and ReLU layers, where the output of the block is summed together with the input of the block.

To ensure the DNNs are implementable on memory constrained hardware, the output size for each convolutional block and each inverted residual block is no larger than the available working memory in the hardware of the logic and face detection DNN processing layer 204 (e.g., lower than 100 kB). To ensure the DNNs are implementable on memory constrained hardware, the total memory size of the weights in all convolutional blocks and all inverted residual blocks is no larger than the available weight memory in hardware (e.g., less than 100 kB).

Figure 4:
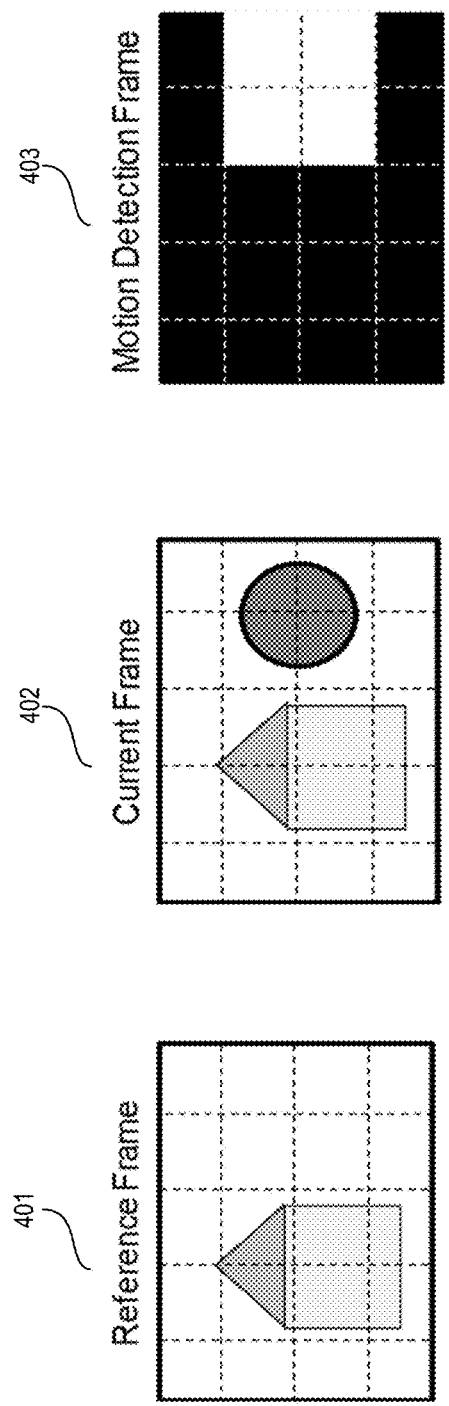
FIG. 4 is a diagram illustrating a reference frame, a current image frame and a motion detection frame, in accordance with various aspects of the present disclosure.

FIG. 4 is a diagram illustrating a reference frame, a current image frame and a motion detection frame, in accordance with various aspects of the present disclosure. Gesture recognition may be performed using a wide range of sensor types (e.g., radar, accelerometer, image sensor, or other suitable sensors). A low-power, always-on image sensor may operate in a power-conserving "sensing" mode, where low-resolution "motion detection" frames 403 are calculated based on the difference between the current image frame 402 and a previously stored reference frame 401, as shown in FIG. 4.

Figure 5:
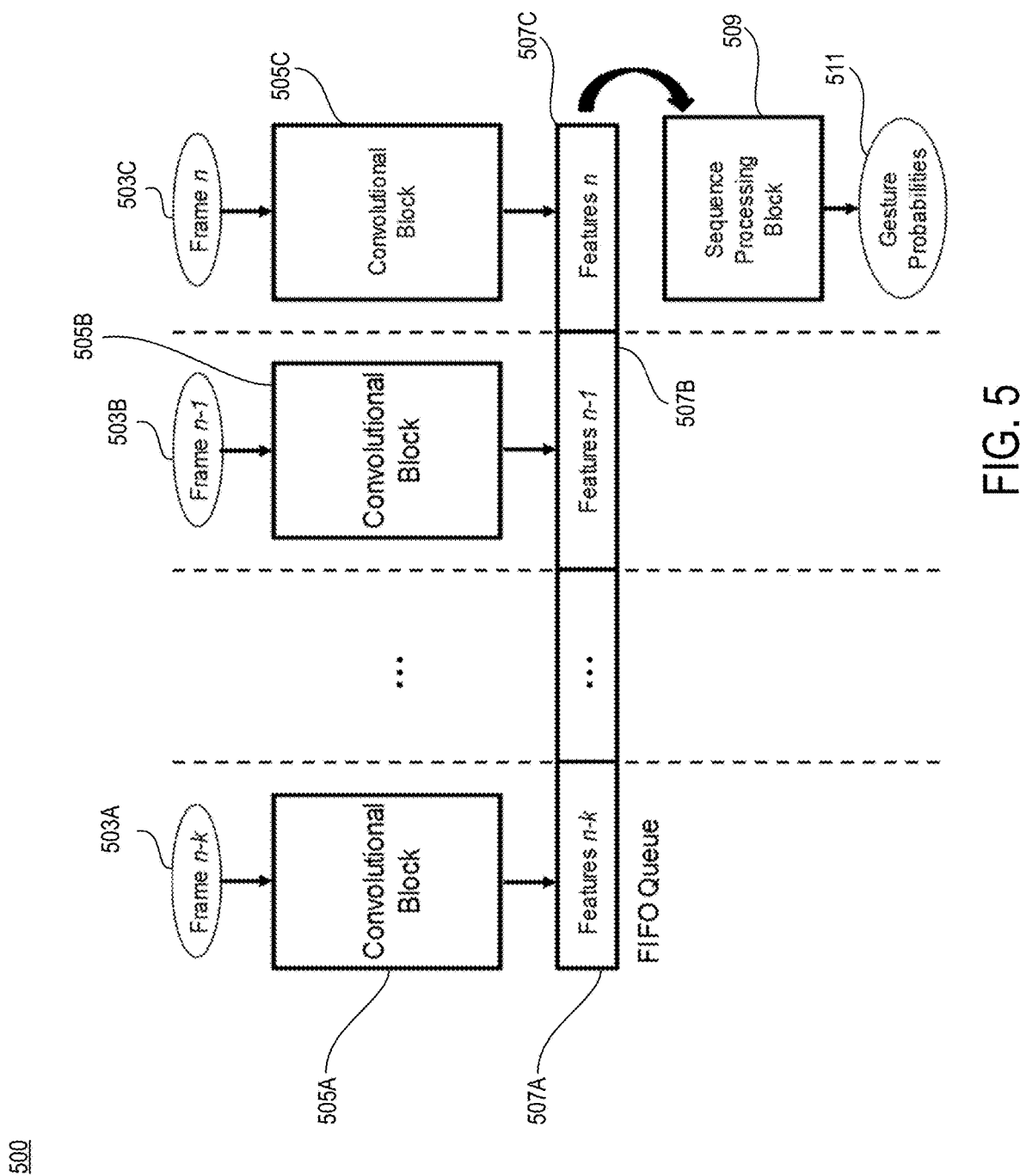
FIG. 5 is a diagram illustrating a method performed by the logic and DNN processing layer of a stacked image sensor, in accordance with various aspects of the present disclosure.

FIG. 5 is a diagram illustrating a method performed by the logic and DNN processing layer of a stacked image sensor, in accordance with various aspects of the present disclosure. According to various embodiments, a gesture recognition DNN architecture classifies a temporal sequence of images corresponding to human hand gestures. The gesture recognition DNN may be integrated into a low-power, always-on CMOS image sensor. The gesture recognition DNN may correspond to the first DNN of the MR-DNN discussed above. According to various embodiments, low-resolution binary motion detection frames may be used as input to the gesture recognition DNN.

Given that gestures are inherently temporal, gesture recognition requires a time sequence of data as input. In this case, the input to the gesture recognition process is a temporal sequence of motion detection frames from a low-power sensor. These motion detection frames (e.g., 503A, 503B, 503C of FIG. 5) may be two-dimensional (2D) arrays of binary data. Each element in the array corresponds to a physical region of the image sensor (i.e. a region of light detecting pixels). Each element in the 2D array is a binary value indicating whether the total amount of light received by the corresponding region of pixels during the current integration time interval has changed by more or less than a predefined threshold, relative to the total amount of light received during some prior reference integration time interval. Calculation of the motion detection frame is performed in-sensor, which significantly reduces the power and memory required per frame.

As shown in FIG. 5, the gesture recognition DNN is composed of two parts: (1) convolutional blocks 505A, 505B, 505C that respectively process each motion detection frame 503A, 503B, 503C independently to obtain each frame's important features 507A, 507B, 507C, and (2) a sequence processing block 509 that concatenates and processes features from the k most recent frames to determine the gesture probabilities 511 for the current frame.

Figure 6A:
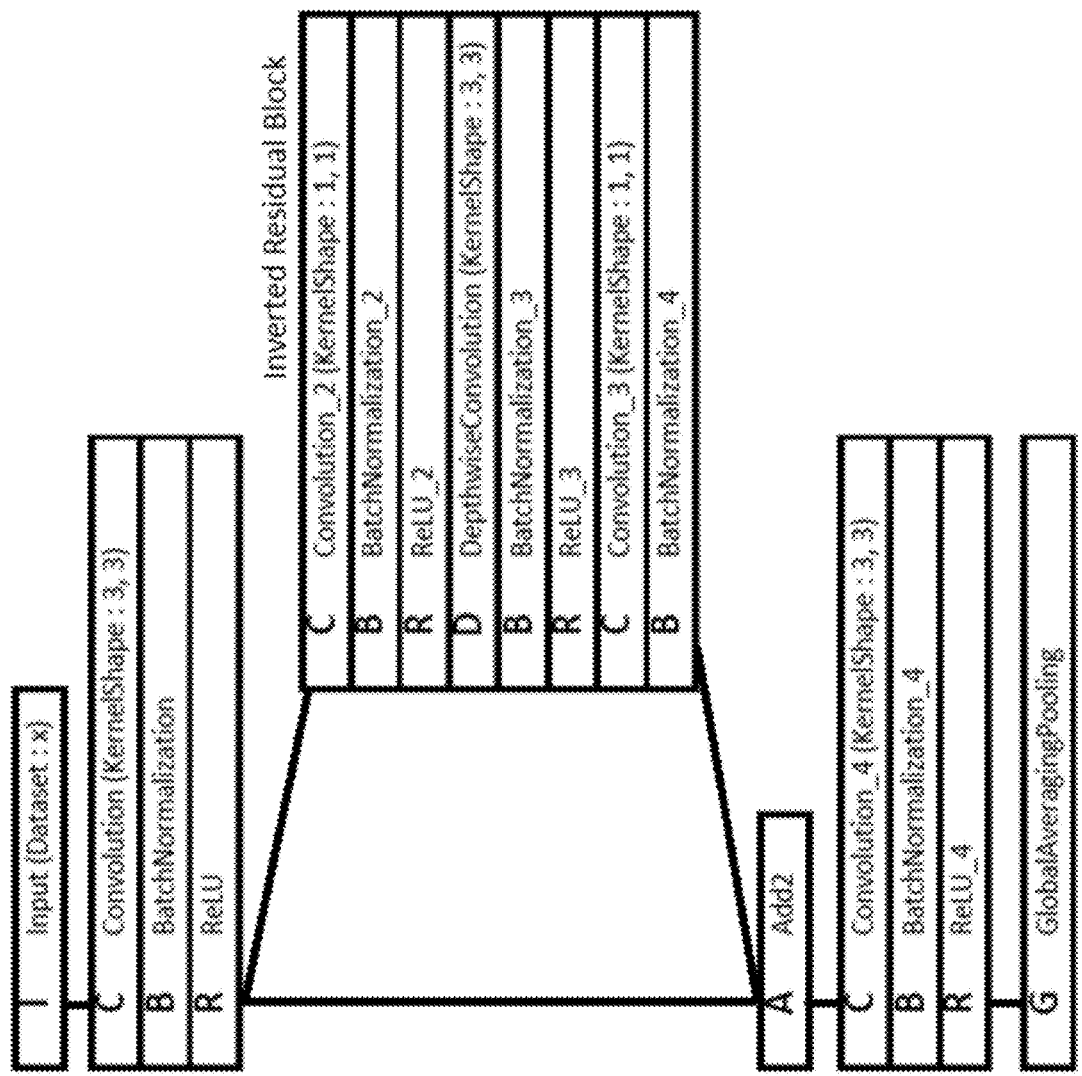
FIG. 6A is a diagram illustrating an inverted residual block in between two convolution+ReLU layers.
Figure 6B:
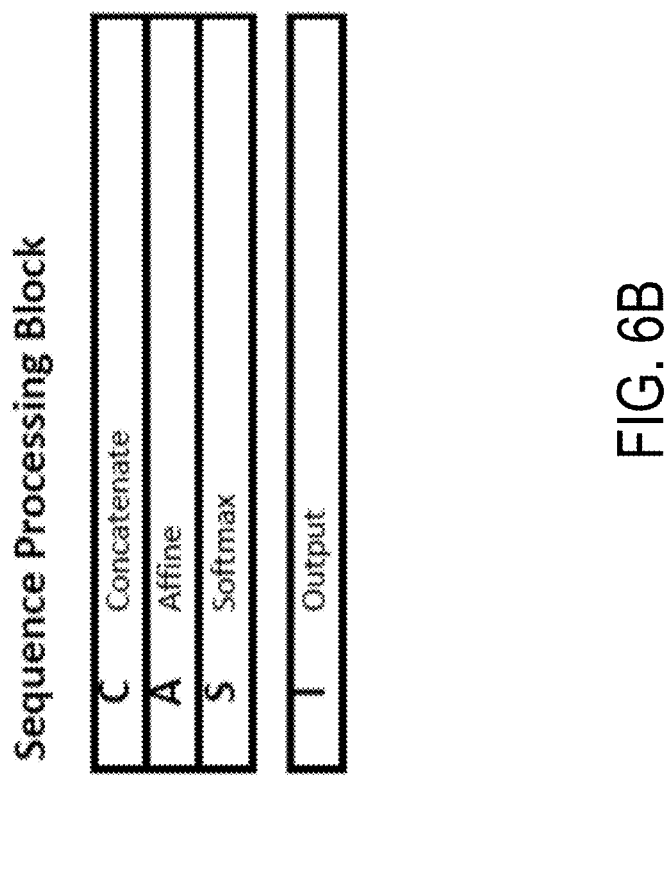
FIG. 6B illustrates an example of the sequence block, in accordance with various aspects of the present disclosure.

FIG. 6A illustrates an example of an inverted residual block in between two convolution+ReLU layers, and FIG. 6B illustrates an example of the sequence block (e.g., sequence block 509 of FIG. 5), in accordance with various aspects of the present disclosure. With reference to FIG. 6A, the convolutional block 600 is composed of a plurality of convolutional layers C followed by nonlinear activations, for example rectified linear unit (ReLU) layers R. The purpose of the convolutional block(s) C is to extract the important features from a given frame. Embodiments of the convolutional block may include convolutional layers and nonlinear activation layers connected in various configurations. For example, in one embodiment, an inverted residual block (consisting of a 1×1 convolution C, followed by a 3×3 depthwise convolution D, followed by a final 1×1 convolution C) is used in between two standard convolution+ReLU layers, as shown in FIG. 6A.

As shown in FIG. 6B, the sequence processing block 650 may include a concatenation block C, an affine block A and a softmax block S. The concatenation block C concatenates the important features from the k most recent frames and processes them to obtain a set of probabilities corresponding to each of the predefined gestures. Embodiments of the sequence processing block may include convolutional layers, including affine (fully-connected) layers, and/or recurrent layers followed by a softmax activation function at the output. For example, in one embodiment, as shown in FIG. 6B, the affine block A includes an affine (fully-connected) layer used to process the concatenated features before applying the softmax block S that includes a softmax function to obtain the output gesture probabilities. The predefined gesture with the highest probability is recognized as the gesture corresponding to the current frame.

Figure 7:
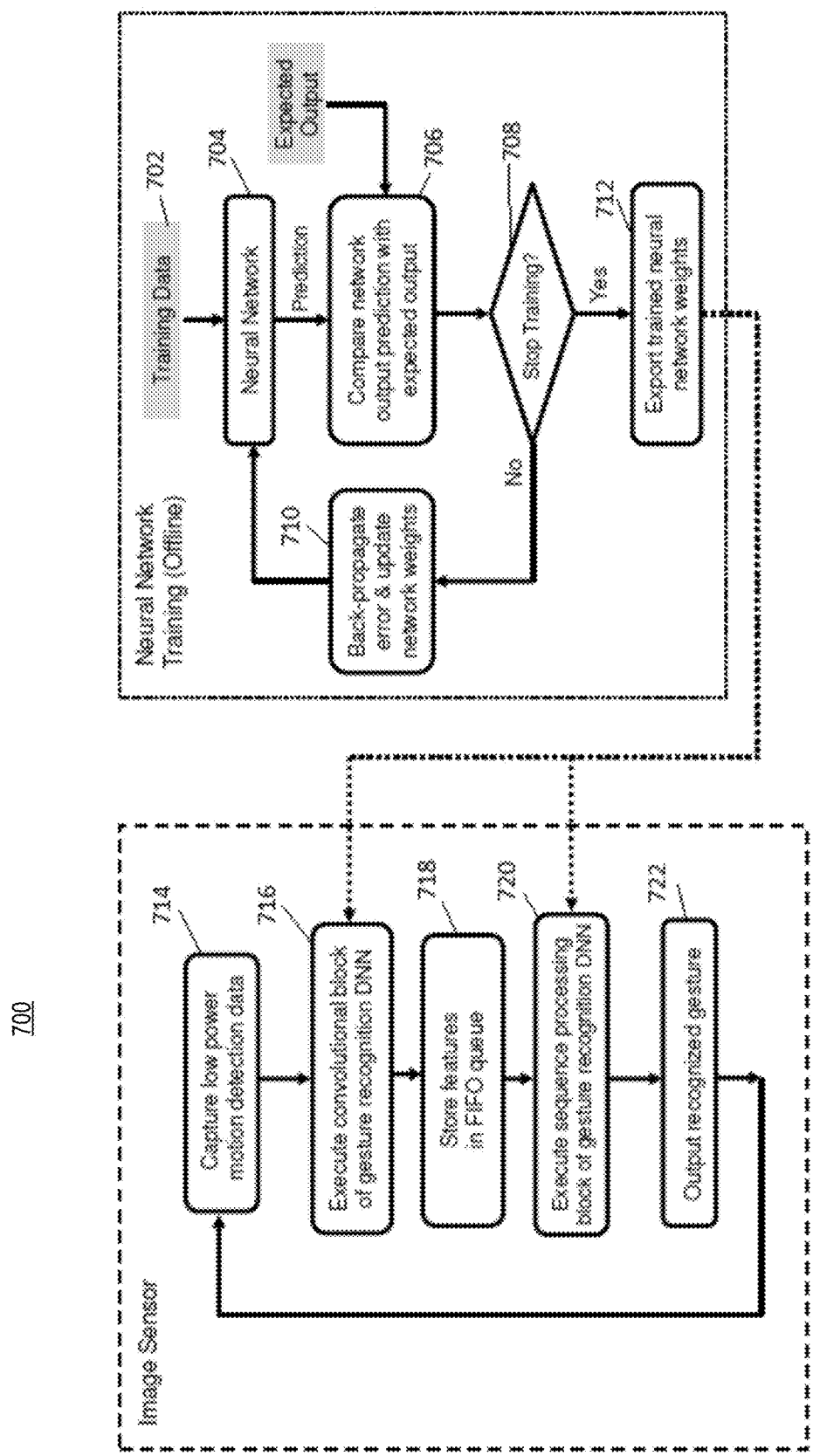
FIG. 7 includes a flow chart illustrating an example process/method 700 of an image sensor, in accordance with various aspects of the present disclosure.

FIG. 7 includes a flow chart illustrating an example process/method 700 of an image sensor, in accordance with various aspects of the present disclosure. During training, the gesture recognition DNN may be trained by showing it labeled examples of predefined gestures and minimizing a categorical loss function through backpropagation (see flowchart of method 700 in FIG. 7). According to various embodiments, training is performed off-sensor, for example on a CPU or GPU, and the trained weights are loaded into the on-sensor memory (Operation 712). The training of method 700 may include Operations 702-710 shown in FIG. 7. Operation 702 may include accessing or obtaining training data. After Operation 702, Operation 704 may include training the neural network using the training data, which results in an output prediction. In Operation 706, the network output prediction may be compared with an expected output (the expected output may be obtained or accessed). Next, a determination of whether to stop training can be performed (Operation 708), which may include checking training conditions. When Operation 708 is NO, an Operation 710 may be performed that includes back-propagating error and updating network weights. When Operation 708 is YES, the Operation 712 may be performed, which may include exporting the trained neural network weights to the image sensor (e.g., a stacked image sensor).

The stacked image sensor may perform Operations 714-722. Operation 714 includes capturing low power motion detection data. During inference (on-sensor), each captured frame (from Operation 714) is processed by executing the convolutional block of the gesture recognition DNN once (Operation 716), and its convolutional block output (e.g., features) is stored in a first-in-first-out (FIFO) queue (718). In Operation 720, the sequence processing block (e.g., Sequence Processing Block 650 of FIG. 6B) of the gesture recognition DNN may be executed. In Operation 722, the recognized gesture may be output (e.g., to a communication bus of an electronic device housing the stacked image sensor). The contents of the FIFO queue correspond to the important features of the k most recent frames. The FIFO queue of important features can be stored much more efficiently and with much less memory than storing the entire k most recent frames.

Types of Gestures

In one embodiment, the predefined gestures may correspond to the movements of a single human hand in specific directions or paths of motion. In another embodiment, the predefined gestures may include the joint movement of two or more human hands, for example in a clapping motion. In another embodiment, the predefined gestures may correspond to movement of a human head, for example in an up-and-down nodding motion or a left-to-right shaking motion.

In some embodiments, recognition of a gesture may trigger a specific command to be sent to control an external electronic device, and different commands may be mapped to different gestures.

Physical Implementation

In one embodiment, the gesture recognition DNN may be implemented as part of a circuit in a stacked low-power image sensor. In another embodiment, the gesture recognition DNN may be implemented on a separate processor that receives input from a low-power image sensor.

Input Data

In one embodiment, the input to the gesture recognition DNN may be binary motion detection data from a low-power image sensor. In another embodiment, the input to the gesture recognition DNN may be ternary motion detection data from a low-power image sensor, where each element in the motion detection frame is −1, 0, or +1, depending on whether the light received by the corresponding pixel region decreased, remained the same, or increased, respectively, relative to a reference frame. In another embodiment, the input to the gesture recognition DNN may be single channel (e.g. grayscale) image data from an image sensor. In another embodiment, the input to the gesture recognition DNN may be multi-channel (e.g. color RGB (Red Green Blue)) image data from an image sensor.

Figure 8:
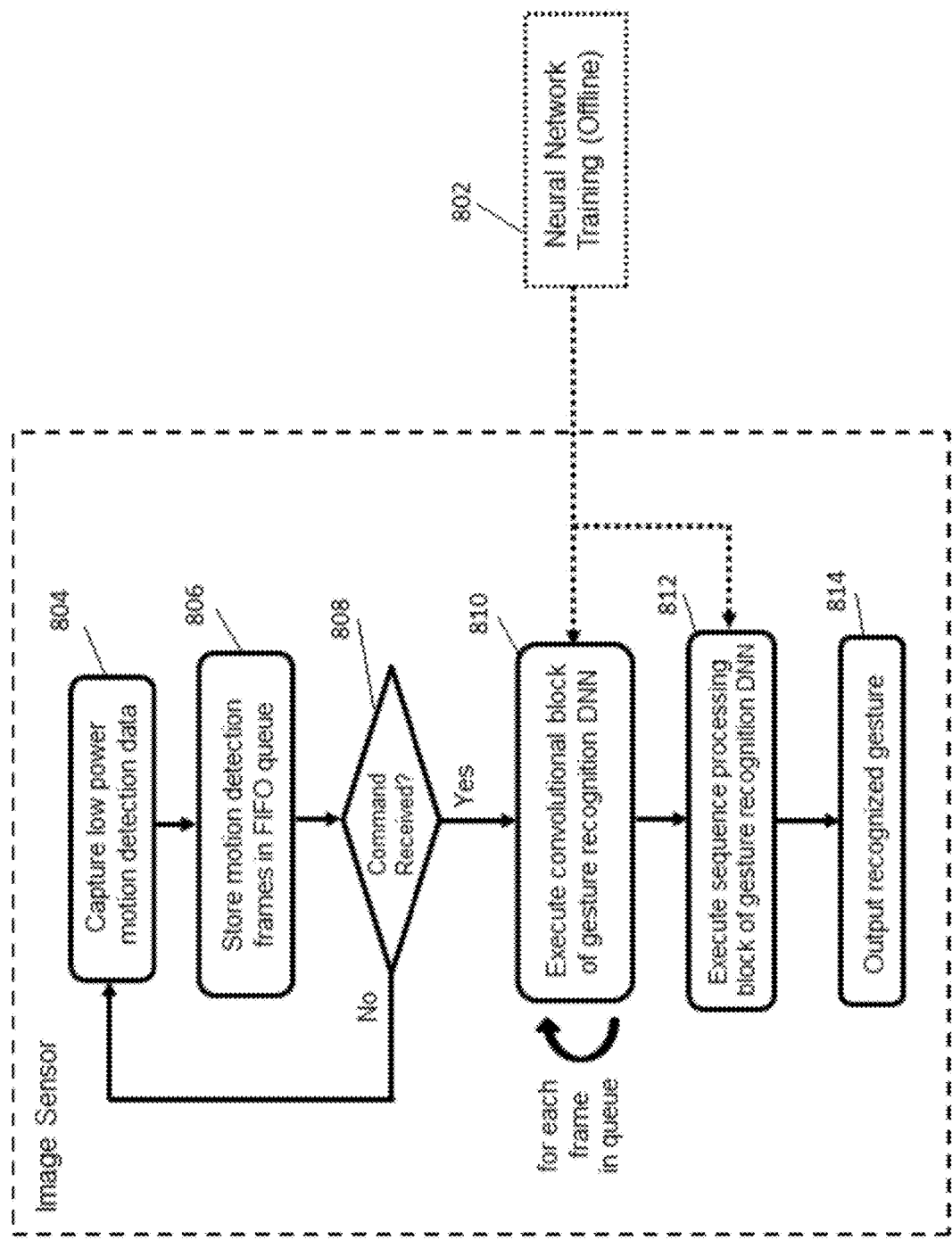
FIG. 8 includes a flow chart illustrating an example process/method 800 of an image sensor, in accordance with various aspects of the present disclosure.

As discussed above, in one embodiment, the gesture recognition DNN may be executed on every frame from the image sensor in a continuous, always-on manner, as shown in method 700 of FIG. 7. FIG. 8 includes a flow chart illustrating an example process/method 800 of an image sensor, in accordance with various aspects of the present disclosure. In this embodiment, the system may store the k most recent frames, and only execute the gesture recognition DNN when a command is received, as shown in method 800 of FIG. 8. FIG. 8 shows a flowchart of a method 800 illustrating Operations 802-814 according to various embodiments. Operations 802 and 804 may be similar to Operations 702 and 704 discussed above and includes training the neural network (e.g., the gesture recognition DNN weights) offline (Operation 702), which may be exported to the image sensor to be used by the gesture recognition DNN, and capturing the lower power motion detection data (Operation 804). The method 800 may also include determining whether a command (e.g., a gesture/motion command) has been received (Operation 808). When a gesture command has not been received (Operation 808: NO), processing may loop back to Operation 804 to repeat the processing of Operations 804 and 806 until a command has been received (i.e., until Operation 808: YES).

When a command has been received (Operation 808: YES), Operation 810 may be performed which includes executing the convolutional block of the gesture recognition DNN for each frame in the FIFO queue. Next, the sequence processing block of the gesture recognition DNN may be executed (Operation 812), and the recognized gesture may be output (Operation 814). Except for differences expressly mentioned herein, the methods 700, 800, 900 and 1000 may have similar functionality for similarly named functions (e.g., the outputting 814 may be similar to the outputting 722, etc.).

Figure 9:
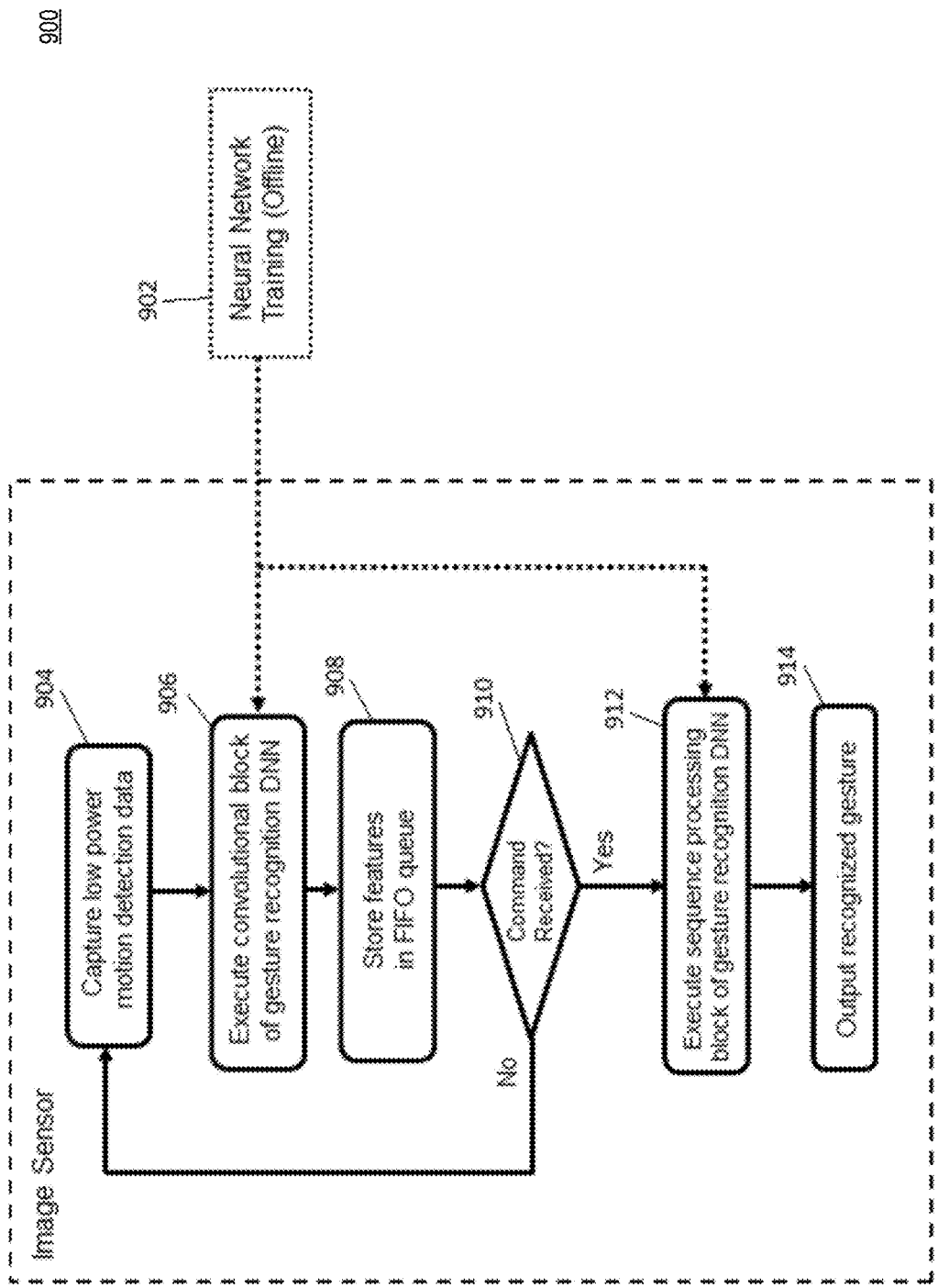
FIG. 9 includes a flow chart illustrating an example process/method 900 of an image sensor, in accordance with various aspects of the present disclosure.

FIG. 9 includes a flow chart illustrating an example process/method 900 of an image sensor, in accordance with various aspects of the present disclosure. In this embodiment, the system (e.g., including stacked image sensor) may execute the convolutional block of the gesture recognition DNN on every frame (Operation 906), store the convolutional block's output features for the k most recent frames in a FIFO queue (Operation 908), but only run the sequence processing block for gesture recognition (Operation 912), when a command is received (Operation 910), as shown in the flow chart of method 900 in FIG. 9.

Figure 10:
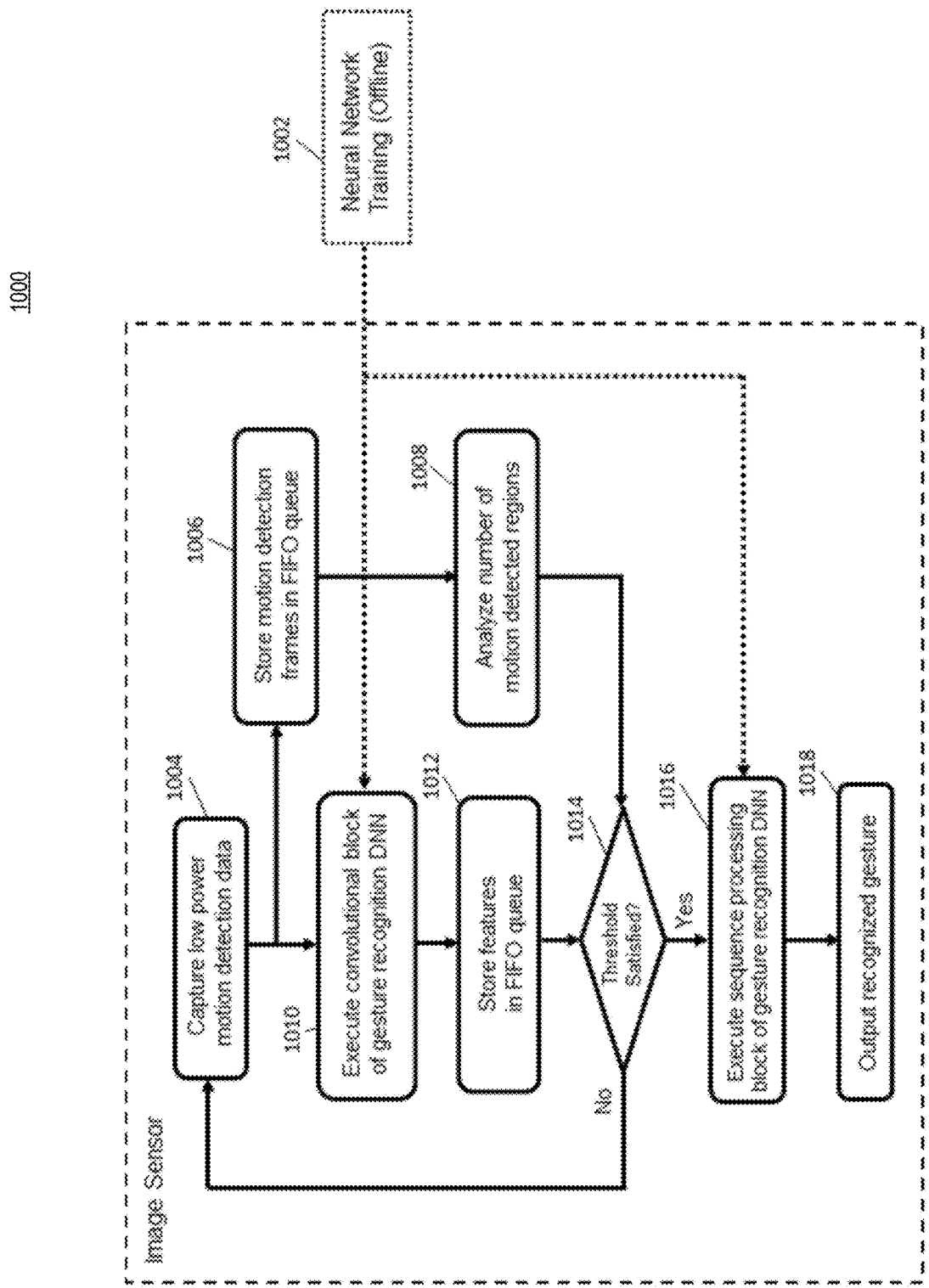
FIG. 10 includes a flow chart illustrating an example process/method 1000 of an image sensor, in accordance with various aspects of the present disclosure.

FIG. 10 includes a flow chart illustrating an example process/method 1000 of an image sensor, in accordance with various aspects of the present disclosure. In this embodiment, the system (e.g., including stacked image sensor) may execute the sequence processing block of the gesture recognition DNN (Operation 1016) only when the k most recent motion detection frames satisfy a particular criteria in Operation 1014 (e.g. the number of regions where motion is positively detected is above some predefined threshold and/or below a different predefined threshold), as shown in method 1000 of FIG. 10.

Prior to neural network processing, the input data may be preprocessed. In this case, standard preprocessing may be performed, with data normalization to −1 to 1 and resizing of the data to the DNN input size (e.g., 160×120). This is in addition to any standard image signal processing (ISP) processing (e.g. demosaicing, denoising, etc.) that occurs.

After neural network processing, the DNN output may be postprocessed.

CONCLUSION

With regard to the processes, systems, methods, heuristics, etc. described herein, it should be understood that, although the operations of such processes, etc. have been described as occurring according to a certain ordered sequence, such processes could be practiced with the described operations performed in an order other than the order described herein. It further should be understood that certain operations could be performed simultaneously, that other operations could be added, or that certain operations described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of the disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A stacked image sensor comprising:
   a pixel array layer configured to capture an image and transfer image data of the captured image; and
   a logic and deep neural network (DNN) layer, the logic and DNN layer including a first DNN that is a preliminary DNN, and a second DNN that is different than the first DNN, wherein
   the logic and DNN layer is configured to:
   receive the image data of the captured image directly from the pixel array layer;
   process first image data using the first DNN to determine whether the first image data includes a predetermined object of one or more predetermined objects and to produce first output data; and
   based on determining that the first image data contains the pre-determined object:
   process second image data in combination with the first output data using the second DNN to produce second output data; and
   output the second image data in combination with the second output data to a communication bus of an electronic device, wherein the first image data includes or is decomposed from the received image data of the captured image, and the second image data is decomposed from the received image data of the captured image or includes image data of another captured image that is different than the captured image, wherein
   the first DNN is configured to detect or predict motion between frames and the second DNN is configured to recognize a gesture in the frames where motion was detected, and
   the logic and DNN processing layer is configured to execute the second DNN, which is the gesture recognition DNN, only when the number of image regions where motion is positively detected is above a first predefined threshold and/or below a second predefined threshold that is different than the first predefined threshold.

2. The stacked image sensor of claim 1, wherein the second image data has a higher resolution than the first image data.

3. The stacked image sensor of claim 2, wherein the first image data includes the image data of the captured image and the second image data includes the image data of the other capture image.

4. The stacked image sensor of claim 2, wherein the logic and DNN layer is further configured to:
   decompose the received image data of the captured image into the first image data and the second image data by performing a non-redundant multi-resolution decomposition of the image data of the captured image data, which is raw image data from the pixel array layer.

5. The stacked image sensor of claim 4, wherein the decomposing of the received image data of the captured image includes decomposing the received image data of the captured image into at least one of: a series of binned images at different scales, a Gaussian pyramid, or a discrete wavelet transform.

6. The stacked image sensor of claim 1, wherein the first DNN and the second DNN are object detection DNNs or object classification DNNs.

7. The stacked image sensor of claim 1, wherein the first DNN is a preliminary classification object detection DNN that detects the predetermined object from a limited class of objects.

8. The stacked image sensor of claim 7, wherein the limited class of objects includes at least a portion of a human body part.

9. The stacked image sensor of claim 1, wherein the pixel array layer is stacked on the logic and DNN layer.

10. A stacked image sensor comprising:
    a pixel layer configured to capture an image and transfer image data of the captured image; and
    a logic and deep neural network (DNN) layer, the logic and DNN layer including a first DNN that is a preliminary DNN, and a second DNN that is different than the first DNN, wherein
    the logic and DNN layer is configured to:
    receive the image data of the captured image directly from the pixel array layer;
    process first image data using the first DNN to determine whether the first image data includes a predetermined object of one or more predetermined objects and to produce first output data; and
    based on determining that the first image data contains the pre-determined object:
    process second image data in combination with the first output data using the second DNN to produce second output data; and
    output the second image data in combination with the second output data to a communication bus of an electronic device, wherein the first image data includes or is decomposed from the received image data of the captured image, and the second image data is decomposed from the received image data of the captured image or includes image data of another captured image that is different than the captured image,
    wherein the second DNN is configured to:
    use a convolutional block that processes each input frame independently to obtain each frame's important features;

store, using a first in, first out (FIFO) queue, a temporal sequence of important features across multiple input frames; and concatenate and process features from a plurality of input frames to determine gesture probabilities for a current frame.

11. A stacked image sensor comprising:

a pixel layer configured to capture an image and transfer image data of the captured image; and a logic and deep neural network (DNN) layer, the logic and DNN layer including a first DNN that is a preliminary DNN, and a second DNN that is different than the first DNN, wherein the logic and DNN layer is configured to:

receive the image data of the captured image directly from the pixel array layer;

process first image data using the first DNN to determine whether the first image data includes a predetermined object of one or more predetermined objects and to produce first output data; and based on determining that the first image data contains the pre-determined object:

process second image data in combination with the first output data using the second DNN to produce second output data; and output the second image data in combination with the second output data to a communication bus of an electronic device, wherein the first image data includes or is decomposed from the received image data of the captured image, and the second image data is decomposed from the received image data of the captured image or includes image data of another captured image that is different than the captured image, wherein the first DNN is configured to detect or predict motion between frames and the second DNN is configured to recognize a gesture in the frames where motion was detected, and the first output data, which is input to the second DNN, includes a sequence of binary motion detection frames or a sequence of ternary motion detection frames.

12. The stacked image sensor of claim 10, wherein the logic and DNN processing layer is configured to:

execute the convolutional block on every frame, store the convolutional block's output features for a plurality of recent frames within a recency threshold in the FIFO queue, and wait for a command to be received to begin executing the sequence processing block.

13. A stacked image sensor comprising:

a pixel array layer configured to capture an image and transfer image data of the captured image; and a logic and deep neural network (DNN) layer, the logic and DNN layer including a first DNN that is a preliminary DNN, and a second DNN that is different than the first DNN, wherein the logic and DNN layer is configured to:

receive the image data of the captured image directly from the pixel array layer;

process first image data using the first DNN to determine whether the first image data includes a predetermined object of one or more predetermined objects and to produce first output data; and based on determining that the first image data contains the pre-determined object:

process second image data in combination with the first output data using the second DNN to produce second output data; and output the second image data in combination with the second output data to a communication bus of an electronic device, wherein the first image data includes or is decomposed from the received image data of the captured image, and the second image data is decomposed from the received image data of the captured image or includes image data of another captured image that is different than the captured image, wherein the logic and DNN layer is further configured to control the output size for each convolutional block, and each inverted residual block of the first DNN and the second DNN to be no larger than 100 kB.

14. The stacked image sensor of claim 1, wherein the total memory size of the weights in all convolutional blocks and all inverted residual blocks is lower than 100 kB.

15. A method comprising:

storing a first deep neural network (DNN), and a second DNN that is different than the first DNN in a logic and DNN layer of a stacked image sensor;

capturing, by a pixel array layer of the stacked image sensor, an image;

transferring, by the pixel array layer, image data of the captured image to the logic and DNN layer of the stacked image sensor;

receiving, by the logic and DNN layer, the image data of the captured image directly from the pixel array layer; and processing, by the logic and DNN layer, first image data using the first DNN to determine whether the first image data includes a predetermined object of one or more predetermined objects and to produce first output data; and based on determining that the first image data contains the pre-determined object:

processing, by the logic and DNN layer, second image data in combination with the first output data using the second DNN to produce second output data; and outputting, by the logic and DNN layer, the second image data in combination with the second output data to a communication bus of an electronic device, wherein the first image data includes or is decomposed from the received image data of the captured image, and the second image data is decomposed from the received image data of the captured image or includes image data of another captured image that is different than the captured image, wherein the first DNN detects or predicts motion between frames and the second DNN recognizes a gesture in the frames where motion was detected, and the logic and DNN processing layer executes the second DNN, which is the gesture recognition DNN, only when the number of image regions where motion is positively detected is above a first predefined threshold and/or below a second predefined threshold that is different than the first predefined threshold.

16. The method of claim 15, wherein the second image data has a higher resolution than the first image data.

17. An electronic device comprising the stacked image sensor according to claim 1.

18. The electronic device of claim 17, wherein the second image data has a higher resolution than the first image data.

19. An electronic device comprising the stacked image sensor according to claim 10.

20. An electronic device comprising the stacked image sensor according to claim 11.

21. An electronic device comprising the stacked image sensor according to claim 13.

* * * * *